Patented Aug. 29, 1944

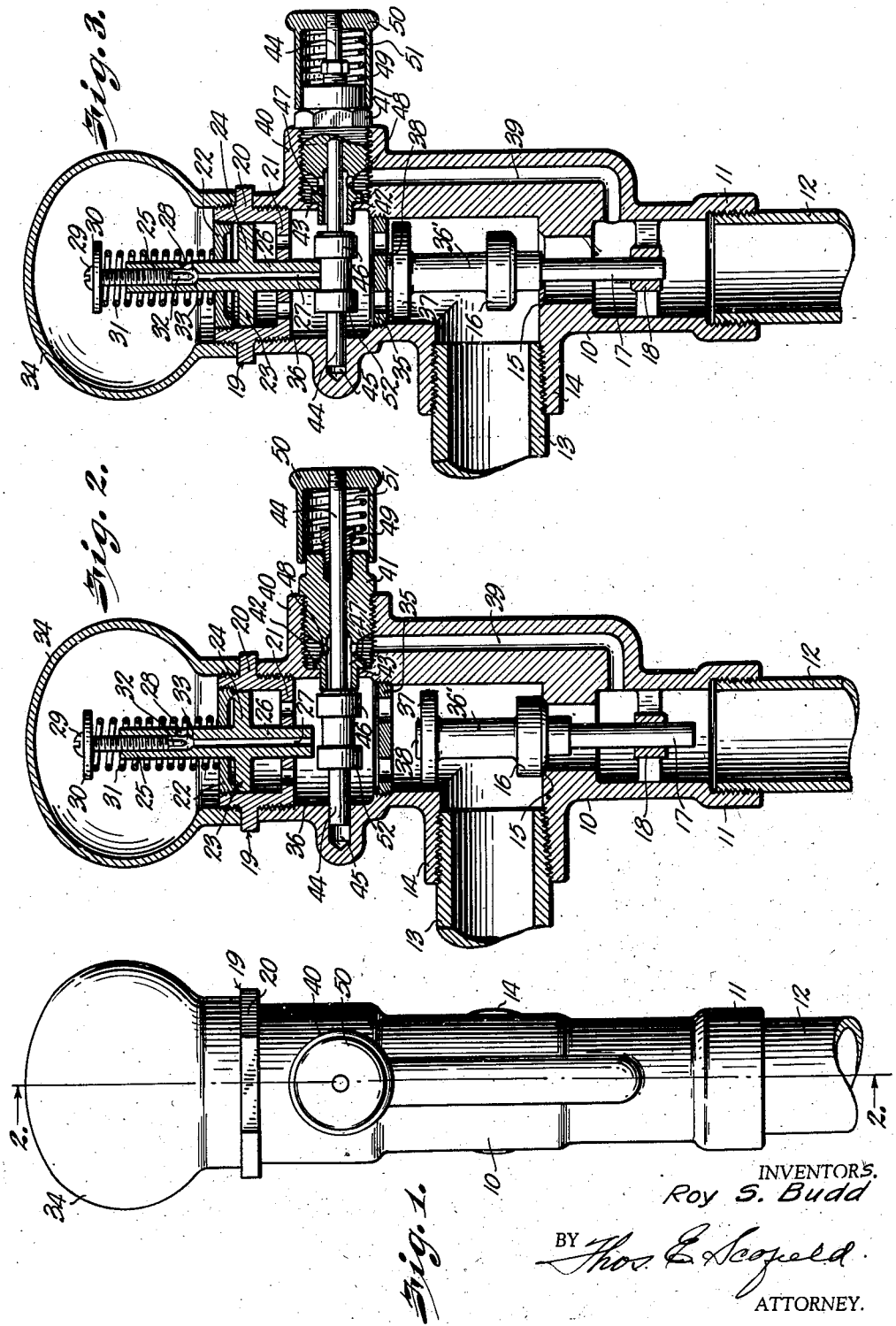

2,357,169

UNITED STATES PATENT OFFICE 2,357,169

VALVE

Roy S. Budd, Slater, Mo.

Application November 13, 1941, Serial No. 418,935

11 Claims. (Cl. 137—139)

My invention relates to new and useful improvements in valves.

An important object of my invention is to provide a valve that may be inserted in a pipe to normally prevent fluid from flowing therethrough and that includes a manually operable part which, when actuated, will permit a predetermined quantity of fluid to flow through the valve.

Many present day flow line systems require that predetermined quantities of the fluid carried by the flow line be permitted to flow through a selected section of the line at spaced intervals of time. Flow through the line is generally controlled by a valve. The valve must be uniquely constructed to accurately regulate the flow and be adjustable to vary the amount of fluid that will flow through the valve at each operation thereof.

I have provided a valve of the above mentioned character that is manually operable and that includes an automatically operable means for holding the manually actuated part of the valve in the open position until a predetermined quantity of fluid has passed through the valve, the said member thereafter automatically releasing the mentioned part and closing the valve.

Still another object of my invention is the provision of a valve of the above mentioned character wherein the said automatically operable member includes adjustable means for regulating the duration of engagement of the member with the manually operable part whereby to permit the quantity of fluid flowing through the valve to be selectively varied.

Other objects and advantages of my invention will be apparent during the course of the following description.

In the drawing, forming a part of this specification and wherein like numerals are employed to designate like parts throughout the same, Fig. 1 is a front elevation of a device embodying my invention, Fig. 2 is a longitudinal sectional view taken on the line 2—2 of Fig. 1, showing the valve parts in the closed position, and Fig. 3 is a view similar to Fig. 2 but showing the valve parts in the open position to permit fluid to flow therethrough.

The accompanying drawing, for the purpose of illustration, shows a preferred embodiment of my invention, which comprises generally a fluid control valve inserted in a flow line. A vertically movable main valve is mounted in the valve body to normally prevent fluid flow therethrough. Provided in the body above the fluid inlet and above the main valve is a pressure chamber, and an enlarged head formed on an upward extension of the valve limits the flow of fluid into the chamber. As long as the pressure in the chamber is the same as the pressure in the body and flow line, the valve will remain seated; however, as soon as the pressure is reduced in the chamber, the fluid flowing into the chamber will react against the head of the valve to unseat the valve.

Therefore, as a second proposition, my device includes an externally operated valve that is mounted in the pressure chamber to normally close a bypass which communicates between the pressure chamber and the valve body on the discharge side of the main valve seat. When the valve is unseated fluid in the chamber bleeds therefrom through the bypass and reduces the fluid pressure in the chamber. Immediately after opening of the externally operated valve the fluid flowing around the head of the main valve and into the chamber unseats the main valve and permits fluid to flow through the valve.

As a third proposition, I provide a pressure sensitive means coactive with the externally operated valve and responsive to fluctuations of pressure in the pressure chamber for controlling the functioning of the main valve and the return of the externally operated valve to its seat. The last mentioned means comprises an air dome surmounting the valve body and communicating with the pressure chamber via a restricted passage. Under normal pressure conditions in the valve body, the air dome will be partially filled with fluid. When the externally operated valve is actuated to effect a reduction of pressure in the chamber a quantity of fluid will discharge from the dome through the passage and permit the compressed air therein to operate a movable spring-influenced latch member into locking engagement with the open externally operated valve. The latch member will remain in engagement with the valve until the pressure in the dome is reduced sufficiently to permit the spring to raise the latch member and release the externally operated valve. The externally operated valve then seats, closing the bypass and permitting the pressures in the chamber and valve body to equalize, thus causing the main valve to settle and seat closing the flow line. The rate of flow of the fluid through the passage is controlled by a needle valve which may be advanced or retracted to regulate the length of time during which the latch will engage the externally operated valve and the amount of fluid flowing through the flow line.

The numeral 10 designates a valve body of substantially tubular formation. The lower end 11 of the body receives an outlet pipe 12 and an inlet pipe 13 is connected to the body intermediate its ends by the radially projecting boss 14. Inlet and outlet pipes 13 and 12 comprise parts of a flow line and the body 10 is inserted therein for controlling the flow of the fluid therethrough. The fluid enters the valve body through the horizontally arranged inlet pipe and discharges therefrom through the vertically extending outlet pipe.

In order that the flow of the fluid through the body may be controlled, I have provided a main valve 16 which seats upon the annular shoulder 15. As illustrated in Figs. 2 and 3, the seat is located between the inlet and outlet ports so that engagement of the valve therewith will prevent the fluid from flowing through the body. The valve is properly positioned on its seat by means of the integral depending stem 17 which slidably fits within the spider or guide 18.

The open upper end of the valve body is closed by the fitting 19. The fitting comprises an externally screw-threaded sleeve portion formed intermediate its ends with a radially projecting flange 20 and at its lower end with a perforate transverse wall 21. The flange 20 seats against the end of the body and the periphery thereof is formed with angularly related, wrench-receiving faces disposed beyond the outer surface of the body. The upper end of the fitting is closed by a disk 22 which screw-threadedly fits within the sleeve and restricts the upward movement of a latch member 23, slidably mounted within the fitting. Member 23 includes a disk-shaped portion 24 which wipingly engages the inner wall of the fitting and upwardly and downwardly extending stems 25 and 26 which project through aligning openings in the disk 22 and wall 21 respectively. A duct 27 extends axially through the stems of the valve 23 and opens through the side wall of the upper stem above the disk 22 via a discharge port 28. The portion of the upper stem extending above the discharge port is internally screw-threaded to receive the adjusting screw 29. A washer 30 seats against the head of the screw and confines one end of a coil spring 31 the other end of which seats against the disk 22. The resilient action of the spring operates to hold the latch member 23 in the elevated position; however, the spring is relatively weak and its action in elevating the member is easily overcome by variations in pressure conditions within the body.

The inner end of the adjusting screw 29 is formed with a needle valve 32 which extends beyond the discharge port for seating against the beveled annular shoulder 33 formed within the duct 27. In its normal position, the needle valve is retracted from its seat to permit fluid in the valve body to flow through the duct and lateral port 28. Obviously, however, the needle valve may be suitably adjusted relative to its seat to provide a fine adjustment for regulating the flow of the fluid through the duct. The fluid discharging through the port 28 is confined within a hollow spherically shaped air dome surmounted upon the valve body and screw-threadedly connecting with the fitting 19.

It may thus be seen that fluid entering the body may rise therein and flow into the air dome 34 through the duct 27. The air dome provides an internal, air-tight chamber and fluid under pressure entering the chamber will rise therein until the trapped air in the top thereof is compressed sufficiently to counteract the pressure of the fluid.

Within the body above the fluid inlet is a perforate partition 35 which defines the lower boundary of a pressure chamber 36. The valve 16 is formed with an upward extension 36' which terminates in an enlarged head 37. The head 37 is disposed above the inlet 13 and below the partition 35. Between its periphery and the body is a narrow annular passage. Extending from the top surface thereof is a projection 38 which may abut, upon opening of the valve, against the bottom of the partition 35. When the main valve 16 is raised the projection serves to limit the upward movement of the valve and to prevent the head from seating directly against the bottom of the partition to close the perforations therein. The head 37 is of greater diameter than the lower valve 16 to avoid equalization of pressures.

Fluid rising in the body will react against the lower face of the head 37 to raise the valve 16 from its seat. The rate of flow of the fluid is restricted by the dimensions of the annular space between the periphery of the head and the inner wall of the body. This space is slightly smaller than the bypass 39 which extends from the pressure chamber 36 to the body at the discharge side of the seat 15 to, upon occasion, permit egress of the fluid from the chamber.

The externally operated valve includes a valve carrier 41 retained in a projecting boss 40 formed in the wall of the pressure chamber 36. The inner end of the valve carrier is of reduced diameter. The reduced portion extends into the pressure chamber and has a radial bead 42 which abuts against the inwardly extending radial lip 43 of the body to form a fluid-tight union therebetween. A valve stem 44 extends through the valve carrier and across the pressure chamber to position the distal end thereof in a socket 45 formed in the chamber wall. A valve 46 is formed on the stem within the chamber, which valve seats against the inner end of the valve carrier to close the channels 47 provided therein. The channels connect with a plurality of lateral ports 48 which open into the bypass 39. Thus, movement of the valve away from the valve carrier will permit fluid within the chamber 36 to flow through the channels and discharge from the ports 48 into the bypass 39. The outer end of the valve stem 44 extends through a stuffing box 49 and receives a thimble 50. A coil spring 51 disposed within the thimble presses against the end of the valve carrier and against the thimble to normally urge the valve 46 against its seat.

As clearly illustrated in Figs. 2 and 3, the portion of the stem 44 extending through the pressure chamber is disposed immediately below the lower stem of the latch member 23. When the valve 46 is seated, it is disposed slightly laterally of the end of the stem 26 and an annular bead 52, formed on the stem 44, is disposed directly below the stem 26.

Under normal pressure conditions within the body, the fluid entering through inlet pipe 13 will flow upwardly past head 37 and into the pressure chamber 36. From the pressure chamber the fluid may flow into the fitting 19 through the perforations in the wall 21 thereof and through the duct 27 in latch member 23 into air dome 34. When valves 16 and 46 are both seated, the fluid pressure in all parts of the valve will be constant. If, however, the thimble 50 is pressed to slide the stem 44 into the body, the valve 46 is unseated and the fluid in the pressure chamber 36 will be permitted to flow through the channels 47 and into the bypass 39. Obviously, unseating of valve 46 will reduce the pressure of the liquid in the pressure chamber. Immediately upon reduction of the pressure above the head 37, fluid from the lower portion of the valve body will flow upwardly into the pressure chamber 36 and the rising fluids will react against the lower face of head 37 to raise the valve 16 from its seat. This last position of the valve 16 is illustrated in Fig. 3, and, as soon as the valve unseats, fluid from inlet pipe 14 may discharge directly into the outlet pipe 12. Also, immediately upon reduction of the fluid pressure in chamber 36, fluid in the air dome 34 will discharge therein through duct 27. The compressed air entrapped in the upper portion of the head will react against the latch member 23 to move the same downwardly and to cause the end of the lower stem 26 to seat between the valve 46 and bead 52, as illustrated in Fig. 3.

I have found, by testing the device, that, as soon as the stem 44 is moved inwardly to open the bypass, the valve 16 will be raised and substantially simultaneously therewith, the latch member 23 will drop to lock the valve 46 in the open position.

Manifestly, the greater portion of the fluid entering the body will discharge through the outlet pipe 12; however, a portion of this fluid will rise into the pressure chamber 36. As hereinbefore described, the head 37 will permit a smaller quantity of fluid to enter the pressure chamber than may be drained therefrom through the bypass. The discharge of fluid through duct 27 into chamber 36 reduces the pressure in dome 34. Fluid will continue to flow through duct 27 until the pressure in the dome is sufficiently reduced so that spring 31 can operate to raise latch member 23, releasing the externally operated valve. After latch member 23 has raised and the manually operated valve has seated, the fluid pressure in chamber 36 increases. As the fluid pressure increases in the chamber, the flow of fluid in the duct 27 will be reversed and fluid from the chamber will flow upwardly through the duct and into the air dome. Seating of valve 46 will prevent further draining of fluid from the chamber 36 through the bypass and will again effect equalization of fluid pressure throughout the body. Fluid will consequently no longer rise from the inlet pipe into the pressure chamber to react against the head 37 of valve 16. This valve will therefore gravitate downwardly against seat 15 to prevent further discharge of the fluid into outlet pipe 12.

Attention is directed to the fact that latch member 23 will remain in the lowered position until the fluid pressure in air dome 34 is reduced sufficiently to permit spring 31 to raise latch member 23. The flow of fluid through the duct 27 may be regulated by adjustment of the needle valve 32 and the positioning of this valve will consequently determine the rate of flow of the fluid through the duct and the length of time during which the latch member will remain in the lowered position. Valve 16 will not be lowered until member 23 releases stem 44 and consequently adjustment of the screw 29 will regulate the length of time during which fluid will flow through the valve.

The device may be used in any flow line where it is desired that a predetermined quantity of fluid be passed by a single operation of the valve. It may be seen that it is only necessary to manually operate the spindle 44 and to hold the same in the inner position until the latch member 23 has had time to engage therewith. The thimble may then be released and the member 23 will hold the stem in the open position for a selected interval. By adjusting screw 29, the interval may be properly regulated. The length of time the latch member engages the externally operated valve will, of course, determine the amount of fluid flowing through the valve. Immediately upon release of the stem and seating of valve 46 the valve 16 will seat to prevent further flow of fluid through the valve.

It is to be understood that the form of my invention herewith shown and described is to be taken as a preferred example of the same and that various changes in the size, shape and arrangement of parts may be resorted to without departing from the spirit of my invention or the scope of the appended claims.

Having thus described my invention, I claim:

1. A valve comprising a body having an internal chamber provided with spaced inlet and outlet ports, a main valve mounted at one side of the inlet port to open and close the outlet port, said main valve having an enlarged head portion at the opposite side of the inlet port and in slight circumferentially spaced relation with the chamber wall to provide a pressure surface against which the fluid in the chamber may react to open the valve and a restricted space through which the fluid may flow into the proximate end of the chamber, a bypass of restricted dimensions communicating between the said proximate end of the chamber and the body at the discharge side of the main body, externally operated valve means normally closing the said bypass, and means for locking the externally operated valve in the open position, said means being automatically responsive to reduction of pressure in the mentioned proximate end of the chamber to move to the valve locking position.

2. A valve comprising a body having an internal chamber provided with spaced inlet and outlet ports, a main valve mounted at one side of the inlet port to open and close the outlet port, said main valve having an enlarged head portion arranged at the opposite side of the inlet port and in slight circumferentially spaced relation with the chamber wall to provide a pressure surface against which the fluid in the chamber may react to open the valve and a restricted space through which the fluid may flow into the proximate end of the chamber, a bypass of restricted dimensions communicating between the said proximate end of the chamber and the body at the discharge side of the main valve, externally operated valve means normally closing the said bypass, and a movable latch means for locking the said last valve in the open position, said means being automatically responsive to the reduction of pressure therebelow to move to the valve locking position and automatically responsive to a subsequent decrease of pressure thereabove to move to the valve releasing position.

3. A valve comprising a body having an internal chamber provided with spaced inlet and outlet ports, a main valve mounted at one side of the inlet port to open and close the outlet port, said main valve having an enlarged head portion arranged at the opposite side of the inlet port and in slight circumferentially spaced relation with the chamber wall at the opposite side of the inlet port to provide a pressure surface against which the fluid in the chamber may react to open the valve and a restricted space through which the fluid may flow into the proximate end of the chamber, a bypass of restricted dimensions communicating between the said proximate end of the chamber and the body at the discharge side of the main valve, externally operated valve means normally closing the bypass, a dome surmounting the valve body and communicating with the internal valve chamber, and a pressure sensitive means between the dome and the valve chamber operative to lock the said last valve in an open position upon reduction of normal pressure in the valve chamber and to release the same upon a subsequent reduction of pressure in the dome.

4. A valve comprising a body having a pressure chamber and fluid inlet and outlet ports therein, a dome surmounting the valve body and communicating with the pressure chamber, a main valve in said body, a seat for said main valve between the inlet and outlet ports, a bypass communicating between the pressure chamber and the valve body on the discharge side of the valve seat, an externally operated valve normally closing the bypass, means interposed between the fluid inlet port and the pressure chamber for limiting the fluid flow thereto, and pressure sensitive means between the dome and pressure chamber, said means responsive to reduction of pressure within said chamber to lock the externally operated valve in an open position until sufficient fluid has drained from the dome to substantially lower the pressure therein, at which time the pressure-sensitive means is responsive to reduced pressure in the dome to release the externally operated valve.

5. A valve comprising a body having a pressure chamber and fluid inlet and outlet ports therein, a main valve in said body, a seat for said main valve between the inlet and outlet ports, a bypass communicating between the pressure chamber and the valve body on the discharge side of the valve seat, an externally operated valve normally closing the bypass, means interposed between the fluid inlet port and the pressure chamber for limiting the fluid flow thereto, and pressure sensitive means coactive with the externally operated valve and responsive to a reduction of pressure at one side thereof to lock the externally operated valve in an open position and to a reduction of pressure at the other side thereof to move to a valve releasing position.

6. A valve comprising a body having a pressure chamber and fluid inlet and outlet ports therein, a dome surmounting the valve body and communicating with the pressure chamber, a main valve in said body, a seat for said main valve between the inlet and outlet ports, said main valve having an enlarged head portion disposed intermediate the fluid inlet and the pressure chamber for controlling fluid flow therein, a bypass communicating between the pressure chamber and the valve body on the discharge side of the valve seat, an externally operated valve normally closing the bypass, and a movable valve locking member between the dome and the pressure chamber coactive with the externally operated valve and responsive to fluctuations of pressure in the dome and chamber for controlling the functioning of the main valve and the return of the externally operated valve to its seat.

7. A valve comprising a body having a pressure chamber and fluid inlet and outlet ports, a dome surmounting the valve body and communicating with the pressure chamber, a main valve in said body, a seat for said main valve between the inlet and outlet ports, a bypass communicating between the pressure chamber and the valve body on the discharge side of the valve seat, an externally operated valve normally closing the bypass, means interposed between the fluid inlet and the pressure chamber for limiting the fluid flow thereto, a movable valve locking member between the dome and the pressure chamber coactive with the externally operated valve and responsive to fluctuations of pressure in the dome and chamber for controlling the functioning of the main valve and the return of the externally operated valve to its seat, and adjustable means coactive with the said valve locking member for regulating the sensitivity thereof to variations of pressure in the dome and chamber.

8. A valve of the character described comprising a hollow body member having an inlet and an outlet, a pressure controlled valve positioned in said body member between said inlet and outlet, an intermediate chamber formed in said body member and communicating with the inlet side of said hollow body member through a relatively small by-pass, a relatively large duct leading from said intermediate chamber to said hollow body member at the outlet side of said pressure controlled valve, a manually controlled valve operable to control the flow of liquid from said intermediate chamber through said duct, a piston operable by the differential of pressure in said intermediate chamber and said hollow body member to operate said pressure controlled valve, automatic pressure operated means whereby said manually controlled valve is maintained in the opened position for a predetermined length of time to maintain a sufficient differential of pressure in said hollow body member and said intermediate chamber to open said pressure controlled valve and permit a flow of liquid through said hollow body member, and a manually adjustable valve to regulate said automatic pressure operated means to vary the time of release of said manually controlled valve.

9. A valve mechanism comprising a hollow valve body having an inlet and an outlet, a valve controlling the flow of liquid to said outlet, an intermediate chamber communicating with said casing at the inlet side of said valve by a small passageway and with the outlet side of said valve by a relatively large valve-controlled duct, manually operable means to open said duct valve, a pressure chamber connected with said intermediate chamber by a passageway, a valve to vary the size of said passageway, means controlled by the differential of pressure in said intermediate chamber and said pressure chamber whereby said duct valve is maintained open for a selective predetermined period of time, and a piston interposed between said intermediate chamber and said hollow valve body operable by the differential of pressure in said intermediate chamber and said valve body during the time that said duct valve is maintained in the open position, to maintain said liquid flow control valve in the open position.

10. A valve mechanism comprising a hollow valve body having an inlet and an outlet, a valve controlling the flow of liquid to said outlet, an intermediate chamber communicating with said hollow valve body at the inlet side of said valve by a small passageway and with the outlet side of said valve by a relatively large valve-controlled duct, manually operable means to open said duct valve, a pressure chamber communicating with said intermediate chamber through a movable tubular valve member, an adjustable valve to vary the flow of liquid through said tubular valve member, a piston carried by said tubular valve member operable by the differential of pressure in said pressure chamber and said intermediate chamber to force said tubular valve member to position to secure said manually operable means in the valve opening position, and means interposed between said intermediate chamber and said hollow valve body operable by the differential of pressure therein to secure said liquid flow valve in the open position so long as said duct valve is maintained in the open position.

11. A valve mechanism comprising a hollow valve body having an inlet and an outlet, a valve controlling the flow of liquid to said outlet, an intermediate chamber communicating with said hollow valve body at the inlet side of said valve by a small passageway and with the outlet side of said valve by a relatively large valve-controlled duct, manually operable means to open said duct valve, a pressure chamber communicating with said intermediate chamber through a movable tubular valve member, an adjustable valve to vary the flow of liquid through said tubular valve member, a piston carried by said tubular valve member operable by the differential of pressure in said pressure chamber and said intermediate chamber to force said tubular valve member to position to secure said manually operable means in the valve opening position, resilient means to normally support said tubular valve member in the non-securing position, and means interposed between said intermediate chamber and said hollow valve body operable by the differential of pressure therein to secure said liquid flow valve in the open position so long as said duct valve is maintained in the open position.

ROY S. BUDD.